(12) United States Patent
Bai et al.

(10) Patent No.: US 6,258,010 B1
(45) Date of Patent: Jul. 10, 2001

(54) TRANSMISSION SHIFTING HYDRAULIC CONTROL SYSTEM

(75) Inventors: Shushan Bai; Robert Lowell Moses, both of Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/524,594

(22) Filed: Mar. 14, 2000

(51) Int. Cl.[7] .......................... F16H 61/04; F16H 61/06; F16H 61/08
(52) U.S. Cl. ........................... 477/143; 477/131; 477/138
(58) Field of Search .................................... 477/143, 131, 477/160, 155

(56) References Cited

U.S. PATENT DOCUMENTS

| | | | |
|---|---|---|---|
| 4,827,806 | * 5/1989 | Long et al. | 74/869 |
| 5,913,916 | * 6/1999 | Bai et al. | 701/59 |
| 6,110,071 | * 8/2000 | Kozan et al. | 477/143 |

* cited by examiner

*Primary Examiner*—Sherry Estremsky
*Assistant Examiner*—Tisha D. Lewis
(74) *Attorney, Agent, or Firm*—Laura C. Hargitt

(57) ABSTRACT

A hydraulic control for an automatic shifting transmission has a plurality of shift logic valves, a high ratio control valve, a low ratio control valve and respective pressure control valves for controlling the bias pressure on the ratio control valves. The shift logic valves control the distribution of fluid to a plurality of torque transmitting mechanisms from the proper ratio control valve. During an upshift sequence, the high ratio control valves establishes the engagement pressure in the oncoming torque transmitting mechanism and the low ratio control valve establishes the engagement pressure in the offgoing torque transmitting mechanism. The pressure from the high ratio control valve is also delivered to a control port on the low ratio control valve to force the exhausting of the offgoing torque transmitting mechanism when the oncoming torque transmitting mechanism reaches its critical torque capacity. Following the ratio interchange, the shift logic valves are then positioned to disconnect the ratio control valves from the torque transmitting mechanisms and connect the oncoming torque transmitting mechanism with another source of pressure. During and subsequent to the ratio interchange, the shift logic valves maintain at least one other torque transmitting mechanism engaged with pressure from the other source of pressure.

5 Claims, 3 Drawing Sheets

| GEAR SELECT | TORQUE TRANSMITTER ||||||||| VALVES |||||
|---|---|---|---|---|---|---|---|---|---|---|---|---|---|
| | 36 | 44 | 34 | 42A | 42B | 32 | 40 | 52 | 54 | 56 | 68 | 70 |
| PARK | | | | PRN | | | | 1 | 0 | 1 | exh | max |
| REVERSE | | | | PRN | | $P_r$/rev | | 1 | 0 | 1 | exh | mod |
| NEUTRAL | | | | PRN | | | | 1 | 0 | 1 | exh | max |
| N-1 | $P_{hi2}$/dv | | | | | | | | | | | |
| 1st | dv | | | dv | dv | | | 1 | 0 | 1 | exh | max |
| 1-2 | | $P_{low1}$/dv | $P_{hi1}$/dv | | | | | 0 | 0 | 1 | exh | exh |
| 1-3 | dv | | $P_{hi1}$/dv | | dv | | | | | | exh | mod |
| 2-3 | | dv/$P_{low1}$ | | | dv | | | 0 | 1 | 0 | mod | exh |
| 2nd | dv | dv | dv | dv | dv | | hold | 0 | 0 | 1 | mod | mod |
| 3rd | dv | | | | dv | | | 0 | 1 | 0 | exh | exh |
| 2-4 | dv | dv | dv/$P_{low1}$ | | dv | | | 1 | 1 | 1 | exh | exh |
| 3-4 | dv/$P_{low1}$ | dv/$P_{hi2}$ | dv | | dv | | | 1 | 1 | 0 | mod | mod |
| 4th | dv/$P_{low2}$ | dv | dv | | dv | | | 1 | 0 | 0 | exh | exh | dv = DRIVE PRESSURE
$P_{hi1}$ = PSI OUT VALVE 66
PRN = LINE PSI
rev = LINE PSI IN REVERSE RATIO $P_{low1}$ = PSI OUT VALVE 62
$P_{low2}$ = PSI OUT VALVE 60
Exh = EXHAUST
max = MAXIMUM OUTPUT PSI
$P_r$ = PSI OUT VALVE 66

$P_{low2}$ = PSI OUT VALVE 64
1 = PRESSURE SET
0 = SPRING SET
mod = MODULATED

FIG. 3

TRANSMISSION SHIFTING HYDRAULIC CONTROL SYSTEM

TECHNICAL FIELD

This invention relates to hydraulic control mechanisms and more particularly to hydraulic systems for controlling the shift sequence of a power transmission.

BACKGROUND OF THE INVENTION

One-way torque transmitting mechanisms have been employed in many automatic shifting transmissions to accommodate the ratio interchange in the transmission. The one-way torque transmitting mechanism is provided to either transmit torque from the engine to a gear member or transmit torque from the gear member to ground. As is well-known, the one way torque transmitting mechanism will release the controlled gear member upon a reversal of torque that occurs during the ratio interchange. This permits a smooth transition between ratios. The one-way mechanisms are mechanical devices that require space in the transmission and also add weight to the transmission.

To eliminate the use of one-way torque transmitting mechanisms, some transmission control systems have incorporated electrohydraulic control systems with "clutch to clutch" shift technology. The control systems have utilized two strategies, open loop control and closed loop control. During open loop control, the oncoming friction torque transmitting mechanism (clutch or brake) is filled with fluid and the pressure is ramped up to the inertial pressure required during the shift. The release timing of the pressure in the offgoing friction torque transmitting mechanism is based on an estimation of the oncoming torque transmitting mechanism fill time. The fill time of the oncoming torque transmitting mechanism varies due to many design and assembly factors such that the release of the offgoing torque transmitting mechanism can be early, causing a flare, or late, causing a tie-up. Some control algorithms have been developed to detect the oncoming clutch fill using an input or output speed signal. However, these have not proved reliable for practical use.

During closed loop control, the offgoing torque transmitting mechanism capacity is reduced to its critical point by generating a predetermined slip speed in the offgoing torque transmitting mechanism. The oncoming torque transmitting mechanism is filled and ramped up to the inertial pressure. As the oncoming torque transmitting mechanism gains capacity, the input speed will drop. As the input speed drop is detected by the microprocessor, the offgoing torque transmitting mechanism capacity is reduced to zero. In the closed loop control, there is a controlled engine flare at the beginning of the interchange causing an output torque dip. Also since the offgoing torque transmitting mechanism is not released until the input speed drop is detected, a tie-up is present during the ratio interchange.

SUMMARY OF THE INVENTION

It is an object of the present invention to provide an improved transmission control system.

In one aspect of the present invention, a plurality of shift logic valves and pressure control valves are interconnected to control the interchange and continuous engagement of a plurality of torque transmitting mechanisms. In another aspect of the present invention, the pressure control valves are comprised of two oncoming torque transmitting mechanism control valves and two offgoing torque transmitting mechanism control valves. In yet another aspect of the present invention, the oncoming torque transmitting mechanism control valves and the offgoing torque transmitting mechanism control valves are arranged in operative pairs with an oncoming torque transmitting mechanism control valve and an offgoing torque transmitting mechanism control valve in each pair.

In still another aspect of the present invention, an interlock passage is connected between each offgoing torque transmitting mechanism control valve and the output pressure of the paired oncoming torque transmitting mechanism control valve. In a further aspect of the present invention, the output pressure of the oncoming torque transmitting mechanism control valve will cause the output pressure of the offgoing torque transmitting mechanism control valve to be reduced below the critical capacity of the offgoing torque transmitting mechanism during an upshift ratio interchange.

BRIEF DESCRIPTION OF THE DRAWINGS

FIG. 3 is a table summarizing the torque transmitting mechanism engagement schedule and valve operation of a transmission incorporating the present invention.

DESCRIPTION OF AN EXEMPLARY EMBODIMENT

Figure 1:
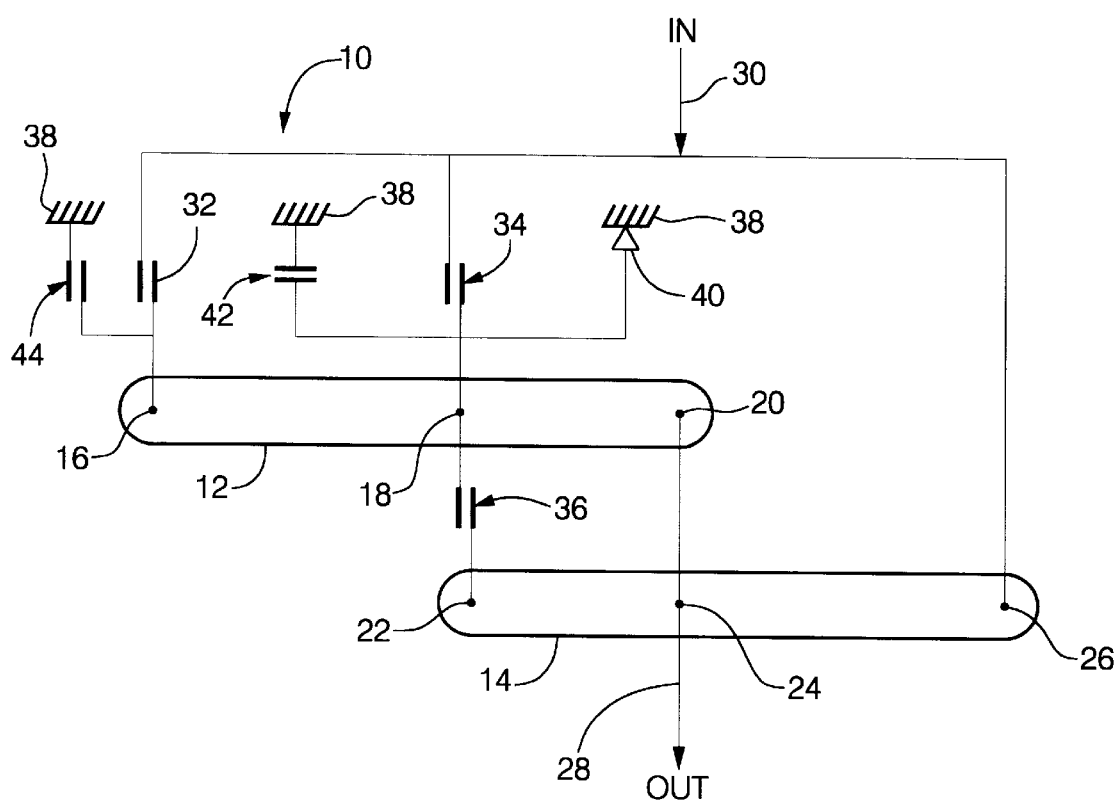
FIG. 1 is a lever diagram of a planetary gearing arrangement utilizing the present invention.

A lever diagram 10, representing the gearing of a planetary transmission, having two lever arms 12 and 14 is shown in FIG. 3. The lever arm 12 has three nodes 16, 18 and 20 that represent a sun gear member, a planet carrier assembly member and a ring gear member respectively. The lever arm 14 has three nodes 22, 24 and 26 that represent a sun gear member, a planet carrier assembly member and a ring gear member respectively. The nodes 20 and 24 are both connected with an output member 28. An input member 30 is connected directly with the node 26.

The input member 30 is selectively connectable with the node 16 through a selectively engageable torque transmitting mechanism 32 and with the node 18 through a selectively engageable torque transmitting mechanism 34. The nodes 18 and 22 are selectively interconnectable by a selectively engageable torque transmitting mechanism 36. The node 18 is also selectively connectable with a stationary or ground portion 38 of the transmission through a one-way torque transmitting mechanism 40 and a selectively engageable torque transmitting mechanism 42. The node 16 selectively connectable with the stationary portion 38 through a selectively engageable torque transmitting mechanism 44.

The torque transmitting mechanisms 32, 34 and 36 are preferably fluid operated frictionally engaged clutch mechanisms. The torque transmitting mechanism 42 is preferably a fluid operated band type brake mechanism, however, a fluid operated disc type brake mechanism can also be employed. When a band type brake is employed, the mechanism will have an apply chamber 42A and a release chamber 42b. The torque transmitting mechanism 44 is preferably a fluid operated disc type brake mechanism. The one-way torque transmitting mechanism 40 is preferably a roller type mechanism. In a current production transmission, having the same lever diagram, a friction torque transmitting mechanism and one-way torque transmitting mechanism are disposed in series between the node 16 and 15 portion 38 in addition to the torque transmitting mechanism 44. In the same transmission, a friction torque transmitting mechanism and one-way torque transmitting mechanism are disposed in series between the nodes 18 and 22 in addition to the torque transmitting mechanism 36. The present invention permits the removal of these mechanisms.

The planetary gear set represented by the lever diagram 10 will provide four forward ratios, a neutral condition, and a reverse ratio. When the first or low forward ratio is desired, the torque transmitting mechanism 36 is engaged. Input torque at the node 26 causes the node 22 to react at node 18 against ground through the torque transmitting mechanism 36 and one-way torque transmitting mechanism 40 which results in forward underdrive ratio between the input member 30 and the output member 28. If engine braking is desired, the torque transmitting mechanism 38 is engaged thereby establishing a positive reaction point at the node 18.

To establish the second forward ratio, the torque transmitting mechanism 44 is engaged and the torque transmitting mechanism 36 remains engaged. This changes the reaction point from node 18 to node 16 resulting in a higher underdrive ratio between the input 30 and the output 28. To establish the third forward ratio, the torque transmitting mechanism 44 is disengaged and the torque transmitting mechanism 34 is engaged. This establishes a direct connection between the node 22 and the input resulting in a direct drive between the input member 30 and the output member 28. To establish the fourth and highest forward ratio, the torque transmitting mechanism 36 is disengaged and the torque transmitting mechanism 44 is engaged. This establishes the node 16 as a reaction point and an overdrive ratio between the input 30 and the node 20 is present. Since the node 20 is directly connected with the output member 28 an overdrive ratio between the input member 30 and the output member 28 is present.

A neutral condition is established by exhausting all of the torque transmitting mechanisms except for the torque transmitting mechanism 42. A reverse condition is established by engaging the torque transmitting mechanism 32 and the torque transmitting mechanism 42 remains engaged. This conditions the node 16 as an input point and the node 18 as a reaction point resulting in a reverse ratio at the node 20 and therefore the output member 28.

Figure 2:
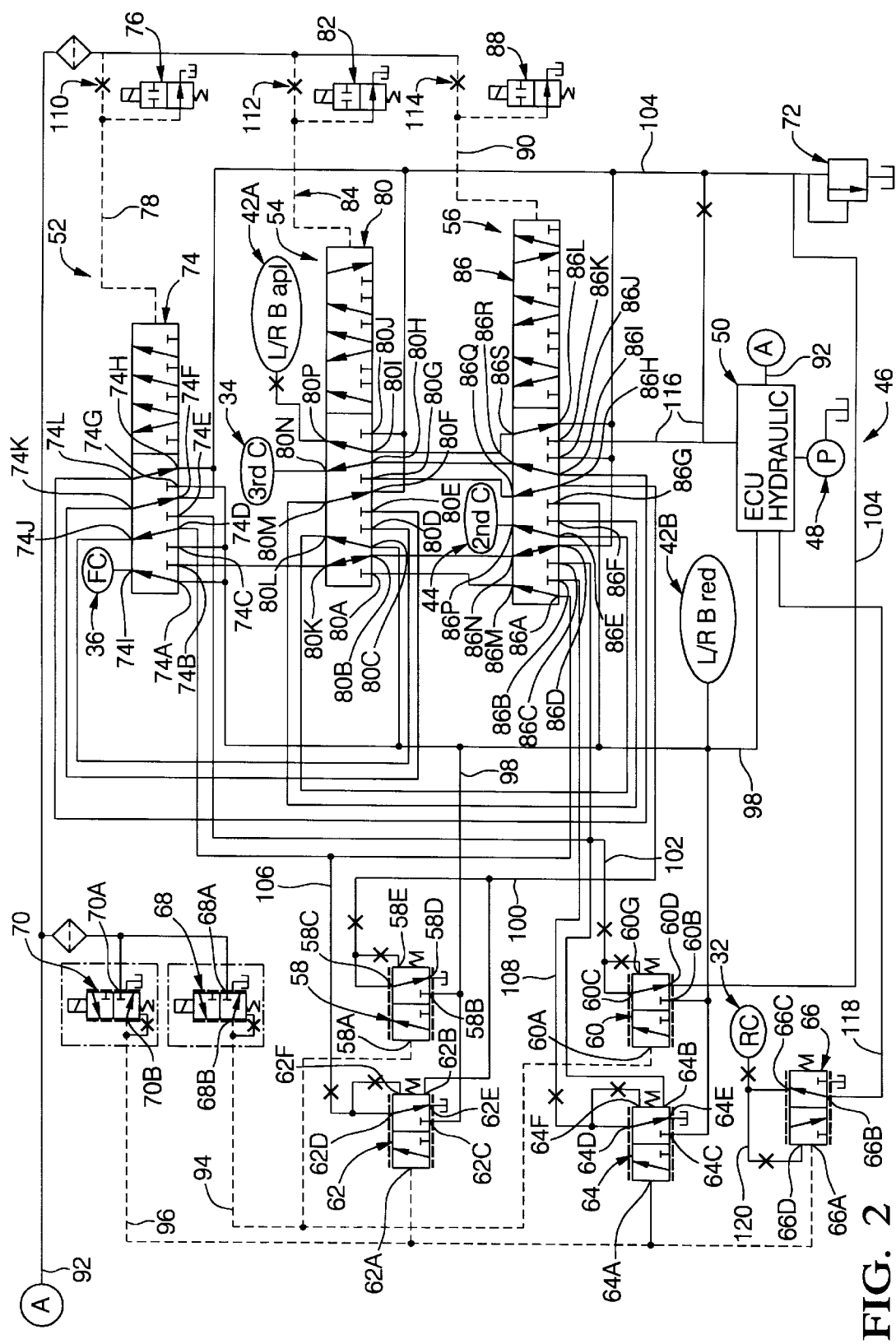
FIG. 2 is a schematic representation of a transmission control system incorporating the present invention.

The torque transmitting mechanisms 32, 34, 36, 40, 42 and 44 are hydraulically operated and controlled by an electro-hydraulic mechanism 46 shown in FIG. 2. The electro-hydraulic mechanism 46 includes a pump 48 that supplies hydraulic fluid to an electro-hydraulic control 50. The electro-hydraulic control 50 incorporates an electronic control module (ECU) that includes a conventional preprogrammed digital computer and hydraulic devices (HYDRAULIC) including conventional pressure control valves and conventional directional valves such as a manual valve. The electro-hydraulic mechanism also includes three shift logic valves 52, 54, and 56, two high ratio control valves 58 and 60, two low ratio control valves 62 and 64, a reverse control valve 66, two pressure control valves 68 and 70 and a backfill valve 72.

The shift logic valve 52 is comprised of a shift valve 74 and a control valve 76. The control valve 76 is a conventional off-on type solenoid valve controlled by the ECU. The shift valve is a directional flow control valve having eight ports 74A, 74B, 74C, 74D, 74E, 74F, 74G, and 74H that are selectively connectable with four ports 74I, 74J, 74K, and 74L. In the spring set position shown, the ports 74 B, C, E, and G are blocked, the port 74A is connected with the port 74I, the port 74D is connected with the port 74J, the port 74 F is connected with the port 74 K, and the port 74 H is connected with the port 74L. In the pressure set position, that is when the valve 76 is energized by the ECU to control the fluid pressure delivered through a passage 78 to the valve 74, the ports 74A, D, F, and H are blocked while the ports 74B, C, E, and F are connected to the ports 74I, J, K, and L respectively.

The shift logic valve 54 is comprised of a directional valve 80 and a control valve 82 that are interconnected by a passage 84. The pressure in the passage 84 is controlled by the valve 82 which is an off-on type solenoid valve controlled by the ECU. The valve 80 has a spring set position shown and a pressure set position which is achieved when the passage 84 is pressurized. The directional valve 80 has ten ports 80A, 80B, 80C, 80D, 80E, 80F, 80G, 80H, 80I, and 80j that are selectively connectable with five ports 80K, 80L, 80M, 80N, and 80 P. In the spring set position shown, the ports 80B, C, F, H, and I are connected with the ports 80K, L, M, N, and P respectively while the ports 80A, D, E, G, and J are blocked. In the pressure set position, the ports 80A, D, E, G, and J and connected with the ports 80K, L, M, N, and P respectively while the ports 80B, C, F, H, and I are blocked.

The shift logic valve 56 is comprised of a directional valve 86 and a control valve 88 that are interconnected by a passage 90. The pressure in the pass 90 is controlled by the valve 88 which is an off-on type solenoid valve controlled by the ECU. The valve 86 has twelve ports 86A, 86B, 86C, 86D, 86E, 86F, 86G, 86H, 86I, 86J, 86K, and 86L that are selectively connectable with six ports 86M, 86N, 86P, 86Q, 86R, and 86S. In the spring set position shown, the ports 86A, D, E, H, I, and L are selectively connected with the ports 86N, M, P, Q, R, and S respectively while the ports 86B, C, F, G, J, and K are blocked. In the pressure set position, the ports 86B, C, F, G, J, and K are connected with the ports 86N, M, P, Q, R, and S respectively while the 86A, D, E, H, I, and L are blocked.

The pressure control valve 68 is a variable pressure type solenoid valve that is controlled in a well-known manner by the ECU. The valve 68 may be of the pulse width modulated (pwm) type which will have an output pressure proportional to the voltage duty cycle imposed on the solenoid by the ECU. The valve 68 has an inlet port 68A connected with a passage 92 that is supplied with a constant pressure from the control 50. The passage 92 also supplies fluid to the solenoids for the valves 76, 82, and 88. The valve 68 has an outlet port 68B that is connected with a passage 94 which in turn is connected with control ports 58A and 60A of the valves 58 and 60, respectively.

The pressure control valve 70 is a variable pressure type solenoid valve that is controlled in a well-known manner by the ECU. The valve 70 may be of the pwm type. The valve 70 has an inlet port 70A connected with the passage 92. The valve 70 has an outlet port 70B that is connected with a passage 96 which in turn is connected with control ports 62A and 64A of the valves 62 and 64, respectively as well as a control port 66A of the valve 66.

The high ratio control valve 58 had an inlet port 58B, an outlet port 58C, an exhaust port 58D and a feedback control port 58E. The inlet control port 58B is connected with a passage 98 that is supplied with pressurized fluid by the control 50 whenever the driver selects a drive position with the manual valve. The pressure in the outlet port 58C is proportional to the pressure in the passage 94 which is provided from the valve 68. The port 58C is connected with a passage 100 that is in turn connected with the port 86H and a control port 62B on the valve 62.

The high ratio control valve 60 had an inlet port 60B, an outlet port 60C, an exhaust port 60D and a feedback control port 60E. The inlet control port 60B is connected with the passage 98 that is supplied with pressurized fluid by the control 50 whenever the driver selects a drive position with the manual valve. The pressure in the outlet port 60C is proportional to the pressure in the passage 94 which is provided from the valve 68. The port 60C is connected with a passage 102 that is in turn connected with the ports 86C, 74E and a control port 64B on the valve 64. The exhaust port 60D is connected with a passage 104 that communicates with the backfill valve 72. Thus the pressure at the port 60D has a minimum pressure as established by the back fill valve 72 which is generally set at approximately 2 psi.

The low ratio control valve 62 has an inlet port 62C, an outlet port 62D, an exhaust port 62E and a control port 62F. the inlet port 62C is connected with the passage 98, the outlet port 62D is connected with a passage 106 which is also connected with the control port 62F. The pressure in the passage 106 is proportional to the pressure in the passage 96 which is controlled by the valve 70. However, when the high ratio control valve 58 is operated and the pressure in the passage 100 reaches a predetermined level, equal to the critical capacity of the oncoming torque transmitting mechanism, the low ratio control valve 62 will be exhausted. The passage 106 is connected with the ports 74D and 86A.

The low ratio control valve 64 has an inlet port 64C, an outlet port 64D, an exhaust port 64E and a control port 64F. The inlet port 64C is connected with the passage 98, the outlet port 64D is connected with a passage 108 which is also connected with the control port 62F. The pressure in the passage 108 is proportional to the pressure in the passage 96 which is controlled by the valve 70. However, when the high ratio control valve 60 is operated and the pressure in the passage 108 reaches a predetermined level, equal to the critical capacity of the oncoming torque transmitting mechanism, the low ratio control valve 64 will be exhausted. The passage 108 is connected with the port 86B.

The valve 76, as previously mentioned, is an off-on solenoid valve. The valve 76 is operable to establish the pressure in the passage 78. The passage 78 is fed from the passage 92 through an orifice or restriction 110. In the off position shown, the valve 76 connects the passage 78 to exhaust such that the pressure in the passage is low and not sufficient to move the valve 74 to the spring set position since the orifice 110 restricts the inflow which the outflow through valve 76 is not restricted. In the on position, the valve 76 blocks the outflow from passage such that the pressure in the passage 78 rises to a level sufficient to move the valve 74 to the pressure set position.

The valve 82, as previously mentioned, is an off-on solenoid valve. The valve 82 is operable to establish the pressure in the passage 84. The passage 84 is fed from the passage 92 through an orifice or restriction 112. In the off position shown, the valve 82 connects the passage 84 to exhaust such that the pressure in the passage is low and not sufficient to move the valve 80 to the spring set position since the orifice 112 restricts the inflow which the outflow through valve 82 is not restricted. In the on position, the valve 82 blocks the outflow from passage such that the pressure in the passage 84 rises to a level sufficient to move the valve 74 to the pressure set position.

The valve 88, as previously mentioned, is an off-on solenoid valve. The valve 88 is operable to establish the pressure in the passage 90. The passage 90 is fed from the passage 92 through an orifice or restriction 114. In the off position shown, the valve 88 connects the passage 90 to exhaust such that the pressure in the passage is low and not sufficient to move the valve 86 to the spring set position since the orifice 114 restricts the inflow which the outflow through valve 88 is not restricted. In the on position, the valve 88 blocks the outflow from passage such that the pressure in the passage 90 rises to a level sufficient to move the valve 86 to the pressure set position.

The valve 72 is a conventional regulator valve that maintains the pressure in the passage 104 at a substantially fixed level as previously mentioned. The pressure level in the passage 104 is sufficient to maintain the apply pistons in the torque transmitting mechanisms filled with hydraulic fluid to reduce the fill time needed during a ratio interchange. This is common practice with electro-hydraulic controls for automatic shifting transmissions.

The manual valve, not shown, in the control 50 is a conventional directional valve that can be manipulated by the operator to a plurality of positions including park, reverse, neutral, and a plurality of drive conditions. A passage 116 is connected to main line pressure at the control 50. The passage 116 is connected between the control 50 and the port 86J. The passage 98 is connected with main line pressure in the control 50 when the manual valve is placed in the drive positions. A passage 118 is connected between the control 50 and the reverse control valve 66 during reverse operation.

The reverse control valve 66 is a downstream regulator valve that control the pressure in the torque transmitting mechanism 32. The valve 66 has an inlet port 66B connected with the passage 118, and outlet port 66C connected by a passage 120 connected with the torque transmitting mechanism 32 and a control port 66D. Fluid pressure at the control ports 66A and 66D reduce the pressure at the outlet port 66C. Thus the pressure at the torque transmitting mechanism 32 is controlled proportional to the pressure produced at the pressure control valve 70.

In park, reverse and neutral, the valves 76 and 88 are actuated to place the valves 74 and 86 respectively in the pressure set position. In park and neutral, the pressure control valve 70 is set to maximum and the pressure control valve 68 is set to exhaust. This ensures that the torque transmitting mechanism 32 will be exhausted. When reverse is selected by the operator, the pressure control valve 70 controlled in a modulating condition to thereby control the pressure output of the valve 66 such that the torque transmitting mechanism 32 is engaged at a controlled rate.

During a neutral to first shift, the shift logic valves 52 and 56 are in the pressure set position and the shift logic valve 54 is in the spring set position. The pressure control valve 70 is set at maximum pressure output and the pressure control valve 68 is controlled to provide a modulated pressure. The output pressure from the high ratio control 60 is directed through valves 86, 80 and 74 to the torque transmitting mechanism 36 which is engaged at a rate controlled by the output pressure of the high ratio control 60 and the one-way torque transmitting mechanism 40 establishes the reaction member. When the first ratio has been completed, the shift logic valve 52 returns to the spring set position and both of the pressure control valves 68 and 70 are set to exhaust. There are two possible first ratio selection, manual and automatic. The automatic selection is described above. During manual first, the passage 116 is pressurized and the apply piston 42A of the torque transmitting mechanism 42 is pressurized to provide a low capacity brake to ensure engine coast braking is present.

During a first to second (1–2), first to third (1–3), or second to third (2–3) ratio interchange, the shift logic valves 52 and 56 are spring set and the shift logic valve 54 is pressure set. During a 1–2 interchange, the pressure control valve 68 is exhausted and the pressure control valve 70 is modulated. The output pressure from the low ratio control valve 62 is directed through valves 74, 80 and 86 to the torque transmitting mechanism 44. When the torque transmitting mechanism 44 reaches the critical capacity, the one-way torque transmitting mechanism 40 will release and the second forward ratio is established. When the second ratio has been established, all of the shift logic valves 52, 54, and 56 will be at the spring set position. The torque transmitting mechanism 44 will be maintained in the engaged condition by pressure from the passage 98 through the valves 80 and 86. The pressure control valves 68 and 70 are both set to exhaust.

During a 1–3 interchange, the pressure control valve 68 is modulated and the pressure control valve 70 is exhausted. The output pressure of the high ratio control valve 58 is directed through the valves 86 and 80 to the torque transmitting mechanism 34 which is engaged at a controlled rate. When the torque transmitting mechanism 34 reaches the critical capacity, the one-way torque transmitting mechanism will release and the third forward ratio is achieved. When the third forward ratio is fully established, the shift logic valve 56 is set to the pressure set position and the torque transmitting mechanism 34 is maintained engaged by pressure from passage 98 through the valves 86 and 80. The pressure control valves 68 and 70 are both set to exhaust.

During a 2–3 interchange, both pressure control valves 68 and 70 are modulated. The pressure control valve 68 is modulated from low pressure to high pressure while the pressure control valve 70 is modulated from high pressure to low pressure. The pressure output of the low ratio control valve 62 is directed to the torque transmitting mechanism 44 through the valves 74, 80 and 86. The pressure output of the high ratio control valve 58 is directed through the valves 86 and 80 to the torque transmitting mechanism 34. The output pressure of the high ratio control valve 58 is also imposed on the control port 62B of the low ratio control valve 62. When the torque transmitting mechanism 34 reaches the critical capacity to transmit the required torque, the low ratio control valve 62 is set to exhaust by the pressure bias from the high ratio control valve 58. When the third forward ratio is fully established, the shift logic valve 56 is set to the pressure set position and the torque transmitting mechanism 34 is maintained engaged by pressure from passage 98 through the valves 86 and 80. The pressure control valves 68 and 70 are both set to exhaust.

During a second to fourth (2–4) interchange, the shift logic valves 52 and 54 are pressure set and the shift logic valve 56 is spring set. The pressure control valves 68 and 70 are both modulated. The pressure control valve 68 increases the pressure output thereof and the pressure control valve 70 decreases the pressure output thereof. The pressure output of the low ratio control valve, as controlled by the pressure control valve 70, is directed to the torque transmitting mechanism 36 through the valves 86, 80 and 74. Since the pressure output of the low ratio control valve 62 starts high and goes low, the torque transmitting mechanism 36 is maintained engaged during the initial portion of the 2–4 interchange. Since the output pressure of the high ratio control valve 58 starts low and goes high, the pressure at the torque transmitting mechanism 34 as delivered through the valves 86 and 80 is increased at a controlled rate. When the pressure in the torque transmitting mechanism 34 is sufficient to establish the critical capacity at the torque transmitting mechanism 34, the pressure in the passage 100 operating at the control port 62B of the low ratio control valve 62 will cause the output pressure thereof to be exhausted and the torque transmitting mechanism 36 will be released or disengaged. When the fourth ratio is fully established, the shift logic valve 54 is moved to the spring set position and both of the pressure control valves 68 and 70 are set to exhaust. The torque transmitting mechanism 36 is exhausted through the shift logic valves 52, 54 and 56 to the passage 104 such that a minimum pressure is maintained thereat. The torque transmitting mechanism 34 is maintained engaged by pressure from the passage 98 through the valves 74, 86, and 80. The torque transmitting mechanism 44 is maintained engaged by pressure from the passage 98 through the valves 80 and 86.

During a third to fourth (3–4) interchange, all of the shift logic valves 52, 54 and 56 are moved to the pressure set position. Both of the pressure control valves 68 and 70 are modulated. The pressure output of the pressure control valve 70 is modulated from high to low and the pressure output of the pressure control valve 68 is modulated from low to high. The torque transmitting mechanism 34 is maintained engaged through the interchange by pressure from the passage 98 through the valves 86 and 80. The torque transmitting mechanism 36 is controlled by the pressure output from the low ratio control valve 64 and the torque transmitting mechanism 44 is controlled by the pressure output from the high ratio control valve 60. The pressure output of the low ratio control valve 64 is modulated downward and the pressure output of the high ratio control valve 60 is modulated upward. The pressure output of the low ratio control valve 64 is directed by the valves 86, 80 and 74 to the torque transmitting mechanism 36 to control the disengagement thereof. The pressure output of the high ratio control valve 60 is directed through the valves 74, 80, and 86 to the torque transmitting mechanism 44 to control the engagement thereof. When the torque transmitting mechanism 44 is pressurized to the critical torque capacity, the pressure from the high ratio control valve in passage 102, operating on the control port 64B will cause the low ratio control valve 64 to exhaust the pressure in the passage 108 and therefore the torque transmitting mechanism 36. When the fourth ratio is fully established, the shift logic valves 54 and 56 are moved to the spring set position and both of the pressure control valves 68 and 70 are set to exhaust. The torque transmitting mechanism 36 is exhausted through the shift logic valves 52, 54 and 56 to the passage 104 such that a minimum pressure is maintained thereat. The torque transmitting mechanism 34 is maintained engaged by pressure from the passage 98 through the valves 74, 86, and 80. The torque transmitting mechanism 44 is maintained engaged by pressure from the passage 98 through the valves 80 and 86.

During a 1–2, 1–3, 2–4, and 3–4 upshift and the steady state third ratio, the apply chamber 42A of the torque transmitting mechanism 42 is exhausted to the passage 104 through the shift logic valve 54. During the steady state second and fourth ratios, the apply chamber 42A is exhausted to the passage 104 through both shift logic valves 54 and 56.

The control 46 uses two low ratio control valves and two high ratio control valves to accommodate the differing torque requirements of the torque transmitting mechanisms during the 3–4 interchange. It is possible to use a single low ratio control valve and a high ratio control valves if variable gain valves are incorporated. For the present control it is believed that the use of four valves provides a more efficient mechanism.

During downshifting, the low ratio control valves are maintained with a higher control pressure from the pressure control valve 70 such that the pressure output of the high ratio control valves will not cause the low ratio control valves to exhaust. The interchange timing is not as critical during a downshift since the speed of the engine must be permitted to increase in any event.

The truth shown in FIG. 3 sets forth the condition of the torque transmitting mechanisms and the engagement pressure applied thereto during the ratio interchanges and the steady state conditions. A blank space indicates that the torque transmitting mechanism is disengaged. The table also shows the operating condition of the shift logic valves 52, 54, and 56 and the pressure control valves 68 and 70 during the ratio interchanges and the steady state conditions. From the above description, it should now be appreciated by those skilled in the art that the upshift ratio interchanges, except from first gear, are made without benefit of one-way mechanisms and with out a tie-up between friction devices. The low ratio one-torque transmitting mechanism 40 can also be eliminated, if desired, by controlling the pressure in the apply chamber thereof with one of the ratio control valves during and up shift.

What is claimed is:

1. A hydraulic control for an automatic transmission having a plurality of forward drive ratios established by the engagement of torque transmitting mechanisms, said control comprising:

an electro-hydraulic control including a source of fluid pressure;

a first torque transmitting mechanism for establishing a first ratio;

a second torque transmitting mechanism for establishing a second and higher ratio;

a first ratio control valve means for distributing a first controlled outlet fluid pressure and being connected with said source;

a second ratio control valve means for distributing a second controlled fluid pressure and being connected with said source;

shift logic valve means disposed in fluid flow relation between said source of fluid pressure, said first and second ratio control valves and said torque transmitting mechanisms;

means including said electro-hydraulic control means and said shift logic valve means for connecting said first torque transmitting mechanism to said first ratio control valve means and for decreasing said outlet fluid pressure thereof during an upshift, connecting said second ratio control valve means to said second torque transmitting mechanism and increasing said outlet fluid pressure thereof during said upshift, disconnecting said source from said first and second torque transmitting mechanisms during said upshift, and connecting said second torque transmitting mechanism to said source when said upshift is completed; and means connecting said outlet fluid pressure of said second ratio control valve means with a port on said first ratio control valve means to enforce a reduction of said outlet fluid pressure of said first ratio control valve means when said second torque transmitting mechanism achieves a predetermined torque capacity.

2. The hydraulic control defined in claim 1 further comprising:

a third torque transmitting mechanism;

said shift logic valve means maintaining said third torque transmitting mechanism in fluid communication with said source before, during, and after said upshift.

3. The hydraulic control defined in claim 2 further comprising:

said transmission having a neutral condition and a lowest forward ratio;

said second ratio control valve means being connected through said shift logic valve means with said third torque transmitting mechanism to control increasing pressure therein during an interchange from the neutral condition to the lowest forward ratio; and said shift logic valve means connecting said third torque transmitting mechanism with said source at the completion of said neutral condition to said lowest forward ratio.

4. A hydraulic control for an automatic transmission having a plurality of forward drive ratios established by the engagement of torque transmitting mechanisms, said control comprising:

a source of fluid pressure;

a first ratio control valve having an inlet port connected with said source and an outlet port;

first means for controlling a bias pressure on said first ratio control valve to control the pressure at said outlet port;

a second ratio control valve having an inlet port connected with said source and an outlet port having a connection with a pressure reducing bias port on said first ratio control valve;

second means for controlling a bias pressure on said first ratio control valve to control the pressure at said outlet port of said second ratio control valve;

shift logic valve means for distributing fluid pressure to a first torque transmitting mechanism before, during and, after a ratio interchange, for directing fluid from said first ratio control valve to a second torque transmitting mechanism during said ratio interchange, and for directing fluid from said second ratio control valve to a third torque transmitting mechanism during said ratio interchange;

said first ratio control valve producing a decreasing pressure during said ratio interchange to reduce a torque capacity of said second torque transmitting mechanism; and said second ratio control valve producing a increasing pressure during said ratio interchange to increase a torque capacity of said third torque transmitting mechanism, said increasing pressure acting on said bias port when said torque capacity of said third torque transmitting mechanism achieves a predetermined level to substantially reduce the decreasing pressure of said first ratio control valve and therefore the torque capacity of said second torque transmitting mechanism.

5. The hydraulic control defined in claim 4 further comprising:

said shift logic valve means being operable to disconnect said first ratio control valve and said second ratio control valve from said second and third torque transmitting mechanisms respectively and to connect said third torque transmitting mechanism with said source subsequent to said ratio interchange.

\* \* \* \* \*

UNITED STATES PATENT AND TRADEMARK OFFICE
CERTIFICATE OF CORRECTION

PATENT NO. : 6,258,010 B1
DATED : July 10, 2001
INVENTOR(S) : Shushan Bai et al.

Page 1 of 1

It is certified that error appears in the above-identified patent and that said Letters Patent is hereby corrected as shown below:

Column 2,
Line 34, delete "FIG. 3" and insert -- FIG. 1 --;

Column 5,
Line 19, delete "the inlet" and insert -- The inlet --;
Line 48, replace "to the" with -- from the --;
Line 60, replace "to the" with -- from the --;

Column 6,
Line 5, replace "to the" with -- from the --;

Column 9,
Line 12, insert -- table -- after "truth".

Signed and Sealed this

Twenty-ninth Day of January, 2002

Attest:

JAMES E. ROGAN
*Attesting Officer*  *Director of the United States Patent and Trademark Office*